March 18, 1930.    S. RUBEN    1,751,361
ELECTRIC CURRENT RECTIFIER
Filed June 1, 1926    2 Sheets-Sheet 1
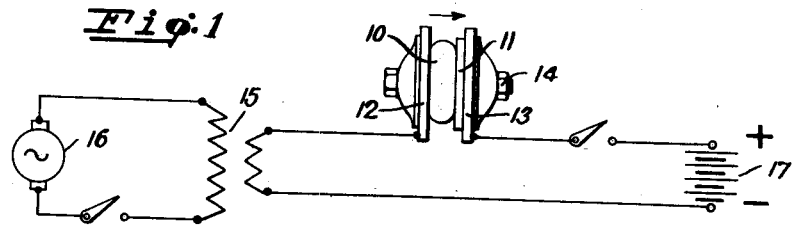
Fig.1
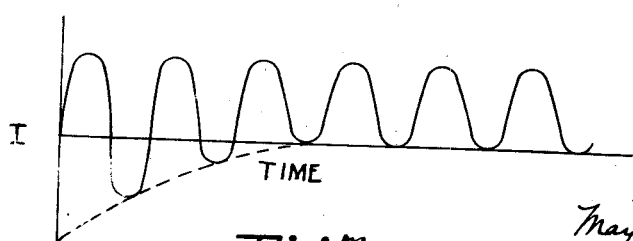
Fig.2
Fig.7
INVENTOR.
Samuel Ruben
BY
Mayer, Warfield Watson
ATTORNEYS.

March 18, 1930.    S. RUBEN    1,751,361
ELECTRIC CURRENT RECTIFIER
Filed June 1, 1926    2 Sheets-Sheet 2

INVENTOR.
Samuel Ruben
BY Mayer, Warfield & Watson
ATTORNEYS.

Patented Mar. 18, 1930

1,751,361

UNITED STATES PATENT OFFICE

SAMUEL RUBEN, OF NEW YORK, N. Y., ASSIGNOR TO RUBEN RECTIFIER CORPORATION, OF ENGLEWOOD, NEW JERSEY, A CORPORATION OF DELAWARE

ELECTRIC-CURRENT RECTIFIER

Application filed June 1, 1926. Serial No. 113,009.

This invention relates to electric current rectifiers and the like which employ asymmetric couples of the dry surface-contact variety.

Rectifiers of this type are characterized by the use of a body of relatively electropositive material, employed as one electrode element, disposed in electrical contact with a body of relatively electronegative material employed as the other electrode element. Such rectifiers depend for their operation upon the resistance and current-blocking characteristics of the film which forms at the junction of the electrode elements as the result of electrochemical action. Rectifiers of this character, known prior to my inventions, have been low in efficiency and limited in their application to small currents, becoming unstable after short periods of use.

The present invention has for its object generally to provide an improved device of the character described, which is efficient, economical and readily manufactured from a wide range of materials, and which may also be given in advance substantially any desired rectifying characteristic.

More specifically, an object is to provide improved electrode elements for asymmetric couples of this character which have substantially unvarying unilateral conductivity when disposed in operative relation and are adapted jointly to contribute in the maintenance of the rectifying characteristics, that is particularly so of the electronegative electrode element.

Other objects of the invention will in part be obvious and will in part appear hereinafter.

The invention accordingly comprises the features of construction, combination of elements, and arrangement of parts, which will be exemplified in the constructions hereinafter set forth and the scope of the application of which will be indicated in the claims.

This application is a continuation in part of my co-pending applications Serial No. 38,780 filed June 22, 1925; Serial No. 51,524 filed August 20, 1925; and Serial No. 69,215 filed November 16, 1925.

For a fuller understanding of the nature and objects of the invention reference should be had to the following detailed description taken in connection with the accompanying drawing, in which:

Figure 1 shows, diagrammatically, a simple asymmetric couple of the dry surface-contact variety embodying the present invention and arranged for rectifying service;

Fig. 2 is a schematic diagram showing the inter-relation between suitable chemical elements that are adapted to be employed as components of the electrode elements of the present invention; and Figs. 3, 4, 5, 6, 7 and 8 are explanatory diagrams.

Figure 3:
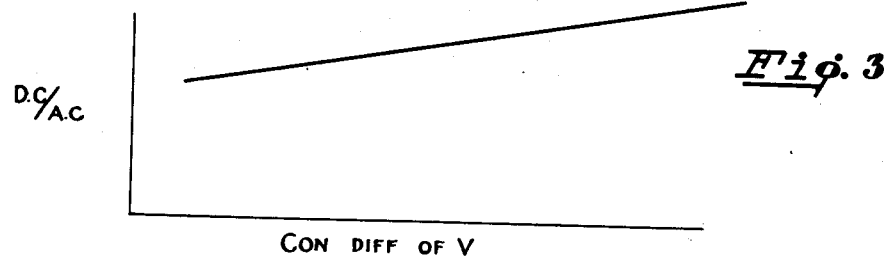

Referring now to the drawing and particularly to Fig. 1, 10 denotes an electronegative electrode element shown in disk form and is of any suitable electronegative substance or metallic compound as more fully explained hereinafter.

The electropositive electrode element is shown at 11, also in disk form, and is in direct contact with the electronegative electrode element and may be of any suitable metallic element or compound which is adapted to cooperate with the electronegative electrode element, in the manner explained more fully hereinafter.

The electrode elements 10 and 11 are here shown as arranged to comprise a simple one-couple rectifying unit, the electrode elements being disposed between conducting terminal-electrodes or end-plates 12 and 13 and are held in cooperative relation under pressure by means of a nut and bolt 14; the latter passing through the electrode elements and insulated therefrom.

As the rectifying unit thus provided is generally a low voltage device when in service, it is in consequence shown as connected to a transformer; such transformer is indicated generally at 15, having its primary connected to an original source of alternating current shown at 16. In series with the transformer secondary is the rectifying unit and a current-consuming device which utilizes the direct current passed by the rectifying unit; such current-consuming device is indicated at 17 in the form of a storage battery adapted to be charged by the so-called "valve" action or unilateral conductivity of the rectifying unit. As is well known in devices of this character, when in operation, direct current is normally passed only when the electronegative electrode element is positively charged and the electropositive electrode element negatively charged. The direction in which direct current passes is indicated in the drawing by the arrow disposed above the rectifying unit.

The rectifying properties of asymmetric couples of the dry surface-contact variety, as here shown, are dependent upon a number of factors. The ratio of the direct current output to the alternating current input may be stated in any suitable terms; for example as the ratio of watts output to watts input, and referred to as the characteristic ratio; or simply as the D. C./A. C. ratio. This ratio is, in consequence, a function of the factors which determine the couple's characteristics; among these factors is the relative position of the electrode components in the electrochemical series. Other factors are the contact difference of potential which exists between the electrode elements, the resistance obtaining at the contacting surfaces between the electrode elements, the current density, the operating temperature, and in a certain manner the pressure which unites the electrode elements. This last factor has merely to exceed a certain critical value, as taught in my copending application, Serial No. 38.780, filed June 22, 1925; namely, that of the dynamic effect of the electric field at the junction of the electrode elements when passing current.

The first named of these factors, namely the divergence in the electrochemical series determines to a large extent the magnitude of the commercial output. As a general rule, the greater this divergence, the greater will be the direct current output to be had by employing asymmetric conductivity as the rectifying principle.

The asymmetric conductivity of electrode elements placed in juxtaposition is due to the electrochemical reaction at the junction of the elements. Thus it is seen that the more widely divergent in the electrochemical series are the electrode elements the more energetic will be the reaction. The electrode elements, however, cannot be taken at random; selection should be exercised, the basis for this selection being taught in my copending applications, Serial No. 51,524 filed August 20, 1925, and Serial No. 69,215 filed November 16, 1925. The preferred principle of selection, however, is more generally depicted in the chart shown in Fig. 2. The electronegative electrode element, as indicated, is to be a metallic compound of a relatively highly electronegative chemical element; for example, a metallic compound of the sixth group in the periodic table, as an oxide, sulphide, selenide, or telluride. The metallic elements used to obtain these compounds may be selected from substantially any of the periodic groups, provided the metallic element has relatively strong combining characteristics, with the elements of the compounds indicated. The suitable metallic elements from Group I are indicated as copper, silver and gold; those from Group II as cadmium and mercury; those from Group IV as zirconium, tin and lead; those from Group V as vanadium, arsenic, neodymium, antimony, tantalum and bismuth; those from Group VI as chromium, molybdenum and tungsten; that from Group VII as manganese; and those from Group VIII as iron, cobalt and nickel.

Comparing these elements with their well-known electrical and physical properties, it is seen, as these increase in atomic number (for example, in Group VI, sulphur has a higher atomic number than oxygen; selenium a higher atomic number than sulphur, etc.), that the compounds have a decreasing electronegative character;' also that they have a decreasing negative temperature coefficient, together with a decreasing specific resistance.

The electropositive electrode element should be selected to be removed from the constituent which characterizes the electronegative electrode element a distance in the electrochemical series which is chemically proportionate to the strength of the electrochemical reaction desired, and may be a metallic element from the periodic groups indicated; for example, from Group II the metallic elements may be beryllium, magnesium, calcium, zinc or an amalgam of mercury. These elements, as indicated by the charts, are suitable for use as companion elements with either oxides, sulphides, selenides or tellurides.

From Group III, the metallic electropositive elements may be boron or aluminum. As these elements have less electropositive characteristics than the former elements, they are not suitable for use with such a wide range of compounds of the electronegative elements as the former. As indicated by the lines joining this group of elements with those above, it is best suited for use only with oxides and sulphides.

Suitable metallic elements from Group V are for example, arsenic, niobium and tantalum. By reason of their proximity in the electrochemical series to the compounds of the sixth group, which are selected for the electronegative element, they are adapted for use substantially only with oxides.

Metallic elements of Group VI which have relatively large atomic numbers, may also be used as electropositive elements in conjunction with oxides. This is indicated in the chart by the symbols for the elements tungsten and molybdenum.

It is important also from another standpoint that the electropositive electrode element be relatively far removed from the electronegative electrode in the electrochemical series, since the stronger the electrochemical reaction, the greater will be its film-forming tendency, with a consequent reduction of the energy consumed in effecting the electrochemical reaction, thereby increasing the efficiency of the couple being used as a rectifier. The film formed under such conditions will in general be physically relatively strong.

When the electropositive electrode element is relatively highly electropositive with respect to the electronegative electrode element, precaution should be taken to prevent atmospheric effects from deleteriously acting upon the elements. This may be achieved in any convenient manner, for example, by the provision of a relatively impervious dielectric envelope, as taught in my copending application, which has become Patent No. 1,649,742 issued Nov. 15, 1927.

Of the other factors mentioned, the contact difference of potential is relatively important, since it represents an initial E. M. F. across or at the inverse current-blocking film and controls materially the efficiency and the voltage which may be impressed across the unit over a wide range of values, which range determines to a large extent the practical service limitations. A characteristic curve depicting the variations of this factor with service conditions is shown in Fig. 3. Here it is seen that the D. C./A. C.-ratio substantially increases directly as the increase in the contact difference in potential.

Figure 4:
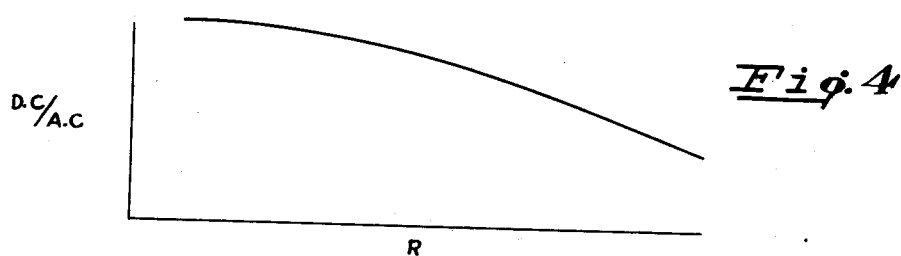

As noted above, the resistance at the juncture of the electrode elements is another factor. The resistance is a joint product, though in practice it is substantially that imparted by the electronegative electrode element and the resulting inverse current-blocking film, since the resistance of the electropositive electrode element is substantially negligible by comparison. This resistance determines the supply of the energy which is available for the electrochemical formation of the inverse current-blocking film and for its maintenance. The variation of the D. C./A. C.-ratio with resistance is illustrated in the characteristic curve shown in Fig. 4.

The phenomenon of asymmetric conductivity, considered from the standpoint of electrochemistry, is a consequence of a reaction depending on the energy available as the result of the resistance losses, generally designated $I^2R$-losses, at the junction of the electropositive and electronegative electrode elements; hence, as a general rule, it may be stated that unless the resistance be of such value that the inverse current discharged through the unit gives an energy product of a value which is sufficient to maintain the desired electrochemical reaction, no film formation takes place and consequently no purely unilateral conductivity results. While the rectifying film or layer is thus a product of both current and contact resistance, still, if the resistance be too low, and an increased current be utilized to yield the proper amount of energy for the electrochemical reaction, there will be in consequence localized areas of formation which will be continuously formed and punctured, due to the local heating and ionization caused by the relatively large formation current which passes. In order that this asymmetric conductivity shall be relatively uniform, the energy consumption for the film formation should not involve excessive current density, but should be sufficient to yield the energy necessary for film formation at all points over the surface from the consequent $I^2R$-losses. The resistance of the electronegative electrode element should hence be as uniformly distributed over the surface of the electronegative electrode element as possible, and of a predetermined value.

Figure 8:
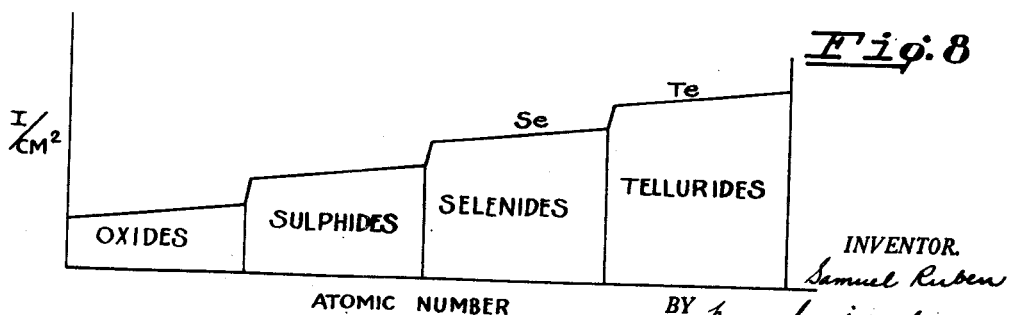

The ionization, which accompanies the local heating and the break-down of asymmetric conductivity when intense formation currents are passing, is obviously a function of the current density at the spots where the ionization occurs. Hence it follows that there is a limit to the maximum current density which it is not practical to exceed in commercial rectifying practice. In Fig. 8 there is shown diagrammatically the relative practical limits of maximum current densities for the various electronegative compounds which may comprise the electronegative electrode element. For example, the maximum current density of an aluminum-cupric sulphide couple under these conditions is approximately one ampere per square centimeter.

Figure 5:
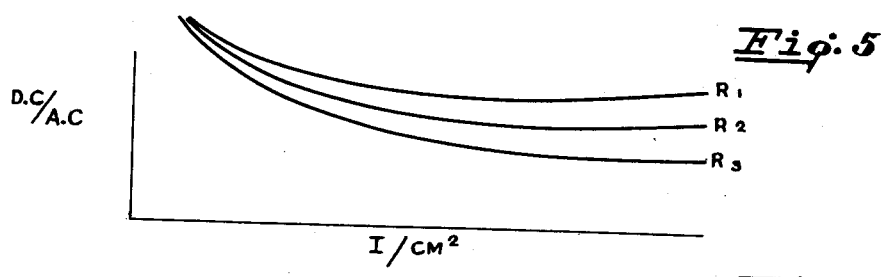

A characteristic curve may likewise be drawn which shows the variation of the D. C./A. C.-ratio with variation in current-density for a given value of the resistance. Three such characteristic curves are shown in Fig. 5. Here the curve denoted $R_1$ is drawn for a relatively high value of resistance, the curves $R_2$ and $R_3$ being drawn for successively lower values.

The energy consumption at the junction of the electrode elements is, of course, proportional to the potential drop in the film formed by electrochemical action between the electrode elements, which drop can be shown to be proportional jointly to the specific resistance and to the current-density, and since there is a practical limit to the latter, this determines a limit to the former. As a general rule therefore, the working factors in commercial rectifiers of this type are determined by the product of the electrochemical position of the electrode components in the electrochemical series with the specific contact resistance of the electrode elements. In case the electronegative electrode element be of relatively high specific resistance, then there is a relatively great potential drop on the film between the contacting surfaces, since the specific resistance of the film is in general greater than that of the electrode element. Should, however, the specific resistance of the electronegative electrode element not be high enough, no stable or consistent rectifying effect results. In some cases, it is practical that the electronegative electrode element shall have its specific resistance at the surface increased. This may be accomplished by any suitable means; for example, by the surface sparking of the same with an electropositive electrode element, or by electrolytic oxidation, or by coating with a film-forming material having a higher specific resistance. One disadvantage incident to the practice of increasing the surface resistance, which is to be avoided, is the tendency for the output characteristic of the rectifier to vary continuously; this may result in increased leakage and operating temperature with a consequent final breakdown. These effects are apparently due to the fact that surface coatings cannot withstand the joint action of electrostatic, thermomechanical and atmospheric effects; these are avoided by the use of coatings as taught in my copending application, which has become Patent No. 1,649,742, above referred to.

If, on the contrary, the specific resistance of the electronegative electrode element be too high, then there will be difficulty in formation at the normal operating potential because of the materially increased internal resistance. Limitation of the formation energy is thus produced, and in order to obtain the proper formation of the rectifying film, an increase in input potential is required, which increase is proportional approximately to the square root of increase in resistance. Still, by impressing a proper potential, an adequate film-forming current and a sufficient supply of energy may generally be had; but in such cases, if this potential drop should exceed that for the inverse connection, or high resistance value, of the film, a continuous make-and-break would occur and a uniform unilateral conducting effect would not result.

Figure 6:
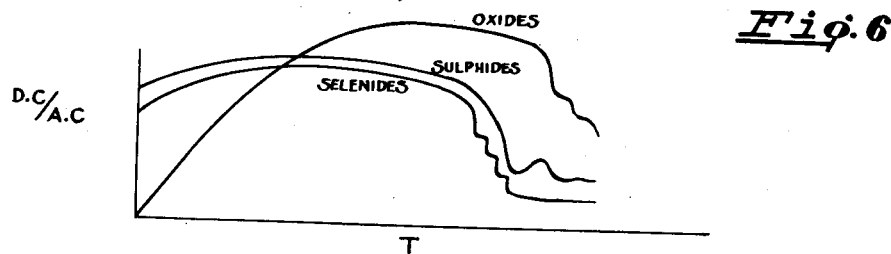

The energy not utilized in the electrochemical reaction of film formation appears as excess heat and is radiated or otherwise dissipated. The rate of radiation is of course a function of the temperature, the temperature in turn affecting the resistance at the junction of the electrode elements, since this has a negative temperature coefficient. As a consequence, when the temperature goes up, the resistance decreases, with a corresponding decrease in the energy consumption by the film. From this it is seen that there is a practical limit, or optimum for the operating temperature, at which an asymmetric couple should be operated. The characteristic curves for the variation of the D. C./A. C.-ratio with temperature for oxides, sulphides, and selenides, respectively are shown in Fig. 6.

Where a rectifying unit is to be designed for maximum efficiency the operating temperature is thus seen to be a critical design factor, and requires that the unit be provided with proper heat-conserving, or dissipating means, as the case may be. It is preferable generally that relatively high operating temperatures be maintained, as by this means the asymmetric couple is made to have relatively high current conductivities, owing to the negative temperature coefficient of the film-forming material. When operating in the atmosphere, in order to conserve the heat, the unit is not infrequently coated with non-heat-radiating material; for example, a white coating. Where such unit is to be enclosed and possibly subjected to higher temperature, its contact resistance may reach a maximum value, especially the contact resistance of the electropositive electrode element.

The time required for the formation of the inverse current-blocking film at the contacting surface is dependent also on the energy available for film formation. An examination of the current pulses passed by a rectifying unit of this character by means of an oscillograph or similar harmonic analyzing device shows a definite progressive formation of the film over a definite period of time which, in most instances, is materially longer than the interval occupied by one cycle of the impressed alternating current. A typical oscillogram is shown in Fig. 7. In this figure the ordinates represent current. The starting conditions shown are those of a newly assembled couple which is initially without a formed inverse current-blocking film. Consequently, with the passage of time, here indicated as distance along the abscissa, current starts as an ordinary alternating current and has ordinates both above and below the zero-line. With each succeeding cycle the ordinates below the zero-line (assuming the direction of the ultimate unilateral passage to be that indicated above the zero-line) are seen to become successively smaller and then to be substantially absent. An envelope is shown in broken lines for the ordinates below the zero-line which meets the zero-line after a predetermined number of cycles, here taken as three. At this point the inverse current-blocking film is indicated as being completely formed and the time of formation is hence that of three cycles. When the current-blocking film is fully formed, the current pulses are thereafter unidirectional; these pulses being substantially uniform as long as the inverse current-blocking film remains properly formed and is not disintegrated by deleterious oxidation or undue temperature conditions. It is found, however, that there is a relation between current readings taken at or near the close of the period of time of film formation to those taken some time after such period, which vary in accordance with the characteristics of the rectifying units. Thus, if a unit be so constructed as to depend for its contact resistance upon surface treatment, in the course of time under load conditions, the surface-coating will vary due to the periodic application of the mechanical force resulting from the dynamic electrical field. Such changes may be accompanied by a continuous increase in the leakage current and temperature of the unit. Consequently, where an electrode element has been treated to provide surface-contact resistance, it should be arranged in the assembled rectifier so that it does not become unduly heated under normal conditions of operation.

From these characteristic curves, it will be seen that by the present invention the characteristics of asymmetric couples employed in rectifying devices and the like may be predetermined in advance, and the device thereby made to be adapted for substantially any desired condition of service; there being a group of several design variables which may be independently fixed.

The elements of an asymmetric couple thus are open to choice in the first instance; for example, where it is desired to rectify commercial voltages of 10 volts it has been found that, in such couple, the choice of magnesium to serve as the electropositive electrode elements is suited to the choice of a sulphide or selenide compound as the electronegative electrode element, such as cupric sulphide or the similar compound of a copper alloy. The divergence or "distance" apart of the components of the electrode elements in the electrochemical series determines the strength of the electrochemical reaction and hence the energy output capacity of the couple, which in turn determines the amount of energy required for the maintenance of the inverse current blocking film. While it is seen that the energy requirements are thus fixed as a consequence of this choice, the energy distribution and its determining factors are yet subject to being arbitrarily fixed.

This choice of variables, by consulting the characteristic curves charted, is seen still not narrowed to one of merely fixing the energy distributing factors; the contact difference of potential and the operating temperature may be chosen independently of the chemical "distance" in the electrochemical series. As pointed out above, the former determines the operating voltages and the efficiency while the latter determines the actual value of the resistance in the couple when passing current; for example, when the couple comprises a magnesium element and a sulphide element of cupric, or similar alloy, the maximum direct current output voltage which it is practical to obtain from a single couple is in the neighborhood of 2.8 volts, with an impressed alternating current voltage of five.

The factors which determine the energy distribution in the electronegative electrode element which may be arbitrarily chosen for any given energy requirements of the rectifying device are seen to be its size and specific resistance, together with its density. Thus, the density of this electrode element should be uniform and should be made to be as near the maximum as possible; the size and specific resistance, however, may be given arbitrary values limited only by the energetics of the electrochemical reaction involved in film-formation between the electrode elements, whereby the current density of the current passed in the reaction may be within the desired limits of current density as pointed out above. When the size has been suited to the physical requirements, the value of the specific resistance is determined and may be one other than that characteristic of simple oxides, sulphides, selenides and tellurides.

Such other values may be achieved by providing composite electronegative electrode elements made from two or more of the simple electronegative compounds selected from the chart in Fig. 2; the components are taken in varying proportions suited to give the desired resultant resistance characteristics and made into a single composite mass in any suitable manner; for example, by thoroughly mixing in pulverized form proper amounts of the respective components, and then homogenizing the mass by the use of either chemical or mechanical means, or by the use of both. As a general rule, it is preferable that the components be all of the same chemical character; for example, sulphides. However, sulphides and selenides have been found to mix well when desired.

Where purely mechanical means are employed to compound the pulverized electronegative electrode components, it is preferable that the components have good elastic and adhesive properties, since these properties insure that the powdered material may be made into a relatively strong coherent mass, simply by the application of relatively high pressures by any suitable means; for example, by means of a hydraulic press. Such a pressed-together electrode element, however, may have skin effects which are undesirable, in which case the application of heat to the electrode element, while being pressed at a temperature sufficient to fuse the parts together, will impart the uniform resistance characteristics desired throughout the body of the electrode element.

Where chemical means are employed, the components would be melted together. This results in an electrode element of relatively uniform characteristics throughout. A still more uniform characteristic may however be imparted where one of the substances is adapted to act as a solvent for the other; for example, antimony sulphide will act as a solvent for cupric sulphide. These two sulphides may be mixed in substantially any proportions and since antimony sulphide has an especially high specific resistance, as compared with cupric sulphide, substantially any resultant specific resistance may be imparted to the mixture. Still lower resultant specific resistances, however, may be obtained than is had by mixing sulphides and selenides; for example, by employing cupric telluride as a component of the electronegative electrode element. Tellurides as a class have lower specific resistance than selenides, and hence are adapted to lower the specific resistance of such composite electrode elements to the full extent practical, as may be desired. Tellurides are soluble in such mixtures to a less extent than selenides.

For high voltage rectification, it is of course desirable that the specific resistance should be relatively high. Otherwise the potential drop across the junction which determines the direct current voltage resulting is relatively low compared with the alternating current in a voltage. This, of course, is undesirable where it is desired to supply current to relatively high voltage current-consuming devices. For such service oxides are inherently adapted. The choice of component for the electronegative electrode element with respect to this characteristic is indicated in the chart in Fig. 2, and except for the decreasing electronegative characteristic along with the decreasing negative temperature coefficient, as one passes from the lower to the higher atomic numbers, may be used with substantially any of the metallic elements indicated as the electropositive electrode element for high voltage rectification.

These latter characteristics impose the practical service limitations upon the asymmetric couple, as explained above, with regard to permissible current densities and temperature for high voltage service.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In dry surface contact rectifying devices and the like, an asymmetric couple comprising an electropositive electrode element of a relatively electropositive metallic body, an electronegative electrode element of a compound of a metal with an electronegative chemical element of a character adapted for the formation electrochemically of an inverse current-blocking film at the junction of said electrode elements, and means for retaining said electrode elements operatively in contact under pressure, the pressure being of a magnitude sufficient to withstand the dynamic effects of the field at said junction; said electrode elements being cooperatively formed to provide symmetric resistance distributed over the contacting surfaces at said junction of a value adapted, when passing inverse current, to provide energy sufficient for the formation and maintenance of said film, whereby rectified currents of appreciable magnitudes may be substantially continuously passed.

2. In dry surface contact rectifying devices and the like, an asymmetric couple comprising an electropositive electrode element of a relatively electropositive metallic body, an electronegative electrode element of a metallic compound with a chemical element of the sixth periodic group of a character adapted for the formation electrochemically of an inverse current blocking film at the junction of said electrode elements, and means for retaining said electrode elements operatively in contact under pressure; said electrode elements being of a character conjointly to have a symmetric contact resistance uniformly distributed at said junction of a value adapted, when passing inverse current, to provide energy sufficient for the formation and maintenance of said film, whereby rectified currents of substantial magnitudes may be passed for commercial periods of time.

3. In dry surface contact rectifying devices and the like, an asymmetric couple comprising an electropositive electrode element of a relatively electropositive metallic body, an electronegative electrode element comprising a metallic compound with a chemical element of the oxygen family of the sixth periodic group of a character adapted for the formation electrochemically of an inverse current-blocking film at the junction of said electrode elements when passing inverse current, and means for retaining said electrode elements in operative contact under pressure, the pressure being of a magnitude sufficient to withstand the dynamic effects of the electric field at the junction of said electrode elements; said electronegative electrode element being of a character adapted to impart symmetric contact resistance at said junction of a character adapted, when passing inverse current not in excess of a predetermined density, to generate the energy required chemically for the formation and maintenance of said film, whereby currents of the order measurable in amperes per square centimeter of active contact surface are passed for commercial periods of time.

4. In dry surface contact rectifying devices and the like, an asymmetric couple comprising an electropositive electrode element of a relatively electropositive metallic body, an electronegative electrode element containing a compound of tellurium of a character adapted for the formation electrochemically of an inverse current-blocking film at the junction of said electrode elements, and means for retaining said electrode elements in operative contact under pressure, the pressure being of a magnitude sufficient to withstand the dynamic effects of the electric field at said junction; said electro-negative electrode element having means providing resistance distributed over the contacting surfaces of said electrode elements at said junction of a value, when passing inverse current, to provide energy sufficient for the formation and maintenance of said film, whereby currents of the order of an ampere per square centimeter of active contact surface are passed for commercial periods of time.

5. In dry surface contact rectifying devices and the like, an asymmetric couple comprising an electropositive electrode element comprising a metal from the second periodic group, an electronegative electrode element comprising a metallic compound of tellurium of a character adapted for the formation electrochemically of an inverse current-blocking film at the junction of said electrode elements, and means for retaining said electrode elements in operative contact under pressure; said electronegative electrode element having means providing resistance distributed over the contacting surfaces at said junction and of a value adapted, when passing inverse current, to provide the chemical heat of formation required by said film, for substantially continuous self-maintenance.

6. In dry surface contact rectifying devices and the like, an asymmetric couple comprising an electropositive electrode element of a metallic body comprising zinc, an electronegative electrode element comprising a maximum valent compound of a metal with tellurium of a character adapted for the formation electrochemically of an inverse current-blocking film at the junction of said electrode elements, and means for retaining said electrode elements in operative contact under pressure; said electrode elements being conjointly formed to have means for imparting contact resistance at said junction of a value adapted when passing inverse current to supply the chemical energy required as the heat of formation by said film, for substantially continuous self-maintenance.

7. In dry surface contact rectifying devices and the like, an asymmetric couple comprising an electropositive electrode element of a metallic body comprising a metal from the second periodic group, an electronegative electrode element comprising a body having a contacting surface of a metallic alloy containing a telluride of a character adapted for the formation electrochemically of an inverse current-blocking film at the junction of said electrode elements, and means for retaining said electrode elements in operative contact under pressure, said electrode elements being conjointly formed to have means for imparting contact resistance at said junction of a value adapted, when passing inverse current, to provide the chemical energy required as the heat of formation by said film, for substantially continuous self-maintenance.

8. In dry surface contact rectifying devices and the like, an asymmetric couple comprising an electropositive electrode element comprising a metal from the second periodic group, an electronegative electrode element comprising a copper compound of tellurium of a character adapted for the formation electrochemically of an inverse-current-blocking film at the junction of said electrode elements, and means for retaining said electrode elements in operative contact under pressure; said electronegative electrode element being of a character adapted to provide symmetric contact resistance distributed over the contacting surfaces at said junction and of a value adapted, when passing inverse current, to provide the chemical heat of formation required by said film, for substantially continuous self-maintenance.

9. In dry surface contact rectifying devices and the like, an asymmetric couple comprising an electropositive electrode element of a metallic body comprising zinc, an electronegative electrode element comprising a maximum valent compound of copper with tellurium of a character adapted for the formation electrochemically of an inverse current-blocking film at the junction of said electrode elements, and means for retaining said electrode elements in operative contact under pressure; said electrode elements being conjointly formed to impart contact resistance at the junction of said electrode elements of a value adapted when passing inverse current to supply the chemical energy required for the heat of formation of said film.

10. In dry surface contact rectifying devices and the like, an asymmetric couple comprising an electropositive electrode element of a metallic body comprising zinc, an electronegative electrode element comprising a body having a contacting surface of a metallic alloy including cupric telluride of a charcally of an inverse current-blocking film at the junction of said electrode elements, and means for retaining said electrode elements in operative contact under pressure; said electrode elements being conjointly provided with means for imparting contact resistance at the junction of said electrode elements of a magnitude adapted, when passing inverse current, to provide the chemical energy required for the heat of formation of said film.

11. In dry surface contact rectifying devices and the like, an asymmetric couple comprising a relatively highly electropositive metallic body, an electronegative electrode element arranged to have a rectifying junction therebetween, said electronegative electrode element comprising a metallic telluride, and resistance means at the junction of said electrode elements of a character adapted to generate energy when passing inverse current sufficient for the formation and maintenance of an inverse current blocking film at said junction.

12. In dry surface contact rectifying devices and the like, an asymmetric couple comprising a relatively highly electropositive metallic body, an electronegative electrode element arranged to have a rectifying junction therebetween, said electronegative electrode element containing a compound of copper and tellurium, and resistance means at the junction of said electrode elements of a character adapted to generate energy when passing inverse current sufficient for the formation and maintenance of an inverse current blocking film at said junction.

13. In dry surface contact rectifying devices and the like, an asymmetric couple comprising an electropositive electrode element of a relatively electropositive metallic body, and an electronegative electrode element of a compound of a metal with an electronegative chemical element of a character adapted for the formation electrochemically of an inverse current-blocking film at the junction of said electrode elements, means for retaining said electrode elements operatively in contact under pressure, the pressure being of a magnitude sufficient to withstand the dynamic effects of the field at said junction, said electronegative electrode element being formed to have a density adapted to impart a symmetric contact resistance at said junction of a predetermined magnitude.

14. In dry surface contact rectifying devices and the like, an asymmetric couple comprising an electropositive electrode element of a relatively electropositive metallic body, and an electronegative electrode element of a compound having an electronegative character adapted for the formation electrochemically of an inverse current-blocking film at the junction of said electrode elements, means for retaining said electrode elements operatively in contact under pressure, the pressure being of a magnitude sufficient to withstand the dynamic effects of the field at said junction, said electronegative electrode element being formed of a plurality of powdered components made from metallic compounds of the chemical elements of the oxygen family of the sixth periodic group compounded to have a contacting surface co-operating with said electropositive electrode element and adapted to provide a symmetric contact resistance at said junction adapted when passing inverse current to provide a predetermined quantity of energy.

15. In dry surface contact rectifying devices and the like, an asymmetric couple comprising an electropositive electrode element of a relatively electropositive metallic body, and an electronegative electrode element of a compound of a metal with an electronegative chemical element of a character adapted for the formation electrochemically of an inverse current-blocking film at the junction of said electrode elements, means for retaining said electrode elements operatively in contact under pressure, the pressure being of a magnitude sufficient to withstand the dynamic effects of the field at said junction, said electrode elements having a coating adapted to control heat radiation whereby the temperature resistance characteristic of the contact resistance at said junction is controlled and maintained within a predetermined range.

16. In dry surface contact rectifying devices and the like, the combination with an electropositive electrode element comprising metallic zinc, of an electronegative electrode element comprising a metal compounded with an element of the sixth periodic group disposed for asymmetric conduction in contact with the first said electrode element.

In testimony whereof I affix my signature.

SAMUEL RUBEN